(12) United States Patent
Docquier et al.

(10) Patent No.: US 10,714,189 B2
(45) Date of Patent: Jul. 14, 2020

(54) ATOMICITY MANAGEMENT IN AN EEPROM

(71) Applicant: PROTON WORLD INTERNATIONAL N.V., Diegem (BE)

(72) Inventors: Guillaume Docquier, Waremme (BE); Ronny Van Keer, Hoeilaart (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 27 days.

(21) Appl. No.: 16/007,941

(22) Filed: Jun. 13, 2018

(65) Prior Publication Data

US 2018/0366200 A1    Dec. 20, 2018

(30) Foreign Application Priority Data

Jun. 14, 2017 (FR) .................................... 17 55351

(51) Int. Cl.
| | |
|---|---|
| *G11C 11/34* | (2006.01) |
| *G11C 16/04* | (2006.01) |
| *G11C 16/20* | (2006.01) |
| *G06F 21/79* | (2013.01) |
| *G11C 16/34* | (2006.01) |
| *G06F 11/14* | (2006.01) |
| *G11C 16/10* | (2006.01) |
| *G11C 16/14* | (2006.01) |
| *G11C 16/26* | (2006.01) |

(52) U.S. Cl.
CPC ............ *G11C 16/20* (2013.01); *G06F 11/141* (2013.01); *G06F 11/1441* (2013.01); *G06F 21/79* (2013.01); *G11C 16/0433* (2013.01); *G11C 16/105* (2013.01); *G11C 16/14* (2013.01); *G11C 16/26* (2013.01); *G11C 16/3454* (2013.01); *G06F 2201/82* (2013.01); *G11C 2211/5646* (2013.01)

(58) Field of Classification Search
CPC ..... G11C 16/20; G11C 16/0433; G11C 16/14; G11C 16/26
See application file for complete search history.

(56) References Cited

U.S. PATENT DOCUMENTS

| | | | |
|---|---|---|---|
| 5,532,463 A | 7/1996 | Debelleix et al. | |
| 8,499,117 B2 * | 7/2013 | Rousseau | ............ G06F 12/0246 711/103 |
| 8,499,192 B2 * | 7/2013 | Rousseau | ............ G06F 12/0246 714/6.1 |
| 8,578,088 B2 * | 11/2013 | Rousseau | ............ G06F 12/0246 711/113 |

(Continued)

FOREIGN PATENT DOCUMENTS

WO    89/10618 A1    11/1989

*Primary Examiner* — Toan K Le
(74) *Attorney, Agent, or Firm* — Seed Intellectual Property Law Group LLP

(57) ABSTRACT

A method of verifying the atomicity of an operation of data update in an EEPROM, includes, during a data writing operation of writing the data, the steps of: initializing at least one first flag to a first value and storing this value in the EEPROM; erasing the data from the EEPROM; writing a value of the data into the EEPROM; and writing at least one second value of the first flag into the EEPROM.

23 Claims, 4 Drawing Sheets

(56) References Cited

U.S. PATENT DOCUMENTS

| | | | |
|---|---|---|---|
| 8,782,338 B2* | 7/2014 | Rousseau | G06F 12/0246 |
| | | | 711/113 |
| 9,081,671 B2* | 7/2015 | Rousseau | G06F 12/0246 |
| 9,229,857 B2* | 1/2016 | Rousseau | G06F 12/0246 |
| 10,261,702 B2* | 4/2019 | Rousseau | G06F 12/0246 |
| 2011/0072028 A1* | 3/2011 | Rousseau | G06F 12/0246 |
| | | | 707/758 |

* cited by examiner

ATOMICITY MANAGEMENT IN AN EEPROM

BACKGROUND

Technical Field

The present disclosure generally relates to electronic circuits and, more specifically, to circuits using a non-volatile rewritable memory. The present disclosure more specifically aims at the atomicity management in an electrically erasable programmable read only memory (EEPROM).

Description of the Related Art

EEPROMs are used, particularly in microcontrollers, to store data in non-volatile fashion.

In certain applications, is it desired to ascertain that the transactions performed fulfill an atomicity criterion. The atomicity of a transaction corresponds to ascertaining that data stored in a memory effectively have a processable and uncorrupted state. This amounts to ascertaining that data in a non-volatile memory have a stable state (the state before the transaction or the state after the concerned transaction).

Transaction atomicity management is particularly used in applications where an interruption of the circuit power supply or the occurrence of an incidental or intentional disturbance may generate the storage of data in a state which makes them either impossible to be subsequently processed or vulnerable in terms of confidentiality or of integrity. For example, in the field of microcircuit cards, it is desired to ascertain that in case of an intentional or incidental untimely pulling out or tearing of a card from the reader where it has been placed, the data contained in a non-volatile memory of the card are reliable. In a circuit integrating a security module, the equivalent of a tearing corresponds to a powering off of the circuit.

BRIEF SUMMARY

There is a desire to improve the atomicity management in an EEPROM.

Thus, an embodiment provides a method of verifying the atomicity of an operation of updating data in an EEPROM, comprising, during an operation of writing the data, the steps of:

initializing at least one first flag to a first value and storing this value in the EEPROM;

erasing the data from the EEPROM;

writing a value of the data into the EEPROM; and writing at least a second value of the first flag into the EEPROM.

According to an embodiment, during an operation of reading the data, the value of the data is only returned if the value of the first flag corresponds to the second value.

According to an embodiment, during a data writing operation, the following operations are performed:

comparing the value of the first flag with the second value; and if the values are equal, returning the value of the data; or if the values are different, returning an error.

According to an embodiment, if the value of the first flag does not correspond to the second value, the data are erased from the EEPROM.

According to an embodiment, if the value of the first flag does not correspond to the second value, the value of at least the first flag is updated with the first value in the EEPROM.

According to an embodiment, the first value corresponds to an erasing.

According to an embodiment, if the value of the first flag corresponds to the second value, the value of the flag is updated with this second value in the EEPROM.

According to an embodiment, the method comprises a first flag and a second flag successively updated and read.

According to an embodiment, if the value of the second flag does not correspond to the second value, the values of the first and second flags are updated with their second respective value in the EEPROM.

An embodiment relates to an electronic circuit comprising an EEPROM, and a processor capable of implementing the method of verifying the atomicity of a data updating operation in the EEPROM.

The foregoing and other features and advantages will be discussed in detail in the following non-limiting description of specific embodiments in connection with the accompanying drawings.

DETAILED DESCRIPTION

Figure 1:
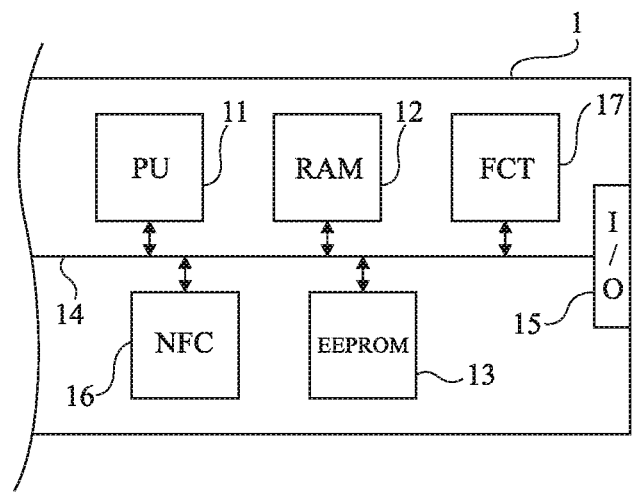
FIG. 1 is a very simplified representation in the form of blocks of an example of an electronic circuit of the type to which embodiments which will be described apply.

The same elements have been designated with the same reference numerals in the different drawings.

For clarity, only those steps and elements which are useful to the understanding of the embodiments which will be described have been shown and will be detailed. In particular, the destination of the information processed by the atomicity mechanism has not been detailed, the described embodiments being compatible with usual applications requiring an atomicity processing.

FIG. 1 very schematically shows, in the form of blocks, an embodiment of an electronic circuit 1 of the type to which the embodiments which will be described apply as an example.

Circuit 1 comprises:

a processing unit 11 (PU), for example, a state machine, a microprocessor, a programmable logic circuit, etc.;

one or a plurality of volatile storage areas 12 (RAM), for example of RAM or register type, to temporarily store information (instructions, addresses, data) during the processing;

one or a plurality of non-volatile storage areas, including at least one memory 13 of electrically erasable and programmable (EEPROM) type for durably storing information, in particular when the circuit is not powered;

one or a plurality of data, address, and/or control buses 14 between the different elements internal to circuit 1; and an input/output interface 15 (I/O), for example, of serial bus type, of communication with the outside of circuit 1.

Circuit 1 may also integrate a contactless communication circuit 16 (CLF—contactless front-end), of near-field communication type (NFC).

Further, circuit 1 may integrate other functions, symbolized by a block 17 (FCT), according to the application, for example, a crypto-processor, other interfaces, other memories, etc.

To guarantee the atomicity of transactions, the storage in the EEPROM of data should only be considered as valid once the transaction is over and the data are said to be stable. In practice, atomicity management methods activate an indicator of the processing of data when said data are extracted from the non-volatile memory, and then organize the storage of the updated data, once the processing is over, the processing indicator then switching state. The atomicity may concern a larger or smaller quantity of data according to the nature of the transaction.

The atomicity of transactions is particularly important in the case of bank-type transactions (payment, for example) where it is desirable to ascertain that the information stored in the EEPROM, for example, the balance of an electronic purse or of a purchase authorization, or the identifier validating a transaction, is reliably stored.

Generally, to guarantee the atomicity of a transaction, atomicity buffers which are updated in a non-volatile memory with the initial and then with the final information are used for a transfer into the main non-volatile memory.

The management of the atomicity of the transactions in a circuit equipped with an EEPROM is generally performed over two states, that is, the atomicity verification algorithms are capable of restoring data from the memory in a stable state, corresponding to the initial state or to the final state. However, the implementation of such security procedures typically uses significant memory space and complex recovery algorithms which are not always justified. Further, in the case of an EEPROM, the multiple writings of data adversely affect the memory lifetime and the power consumption.

The embodiments which are described hereafter provide a three-state atomicity algorithm, that is, capable if indicating whether the readout data are:
  in a stable state, that is:
  in the initial state, that is, they have not been affected by the operation during which the interruption has occurred and they are thus in a stable state; or
  in the final state, that is, the data have been modified by the operation without for an interruption to have occurred or before the occurrence of an interruption and they are thus also in a stable state; or
  in an undetermined or "lost" state, that is, the data cannot be restored in a state corresponding to the initial state or to the final state.

The fact of providing an undetermined or "non-reliable" state enables to simplify constraints in terms of duration of execution of the processes and to decrease the number of memory updates.

This aspect is particularly important in the case of an EEPROM having its lifetime and its power consumption strongly depending on the number of write operations. This problem is not necessarily posed for other types of memories, which consume less power in write operations (an EEPROM-type memory typically employs a write voltage of more than ten volts) or having a less critical life expectancy.

According to the described embodiments, a flag or atomicity indicator of one or a plurality of bits (for example, a byte), having a size independent from the size of the data to be protected, is provided. Thus, the operations and the size of the memory space do not have to be duplicated, the data do not have to be duplicated either before their update by the operation having its atomicity desired to be monitored.

Figure 2:
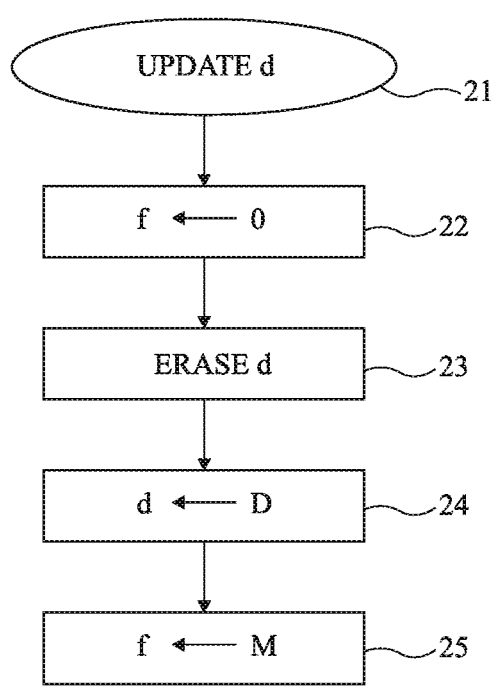
FIG. 2 schematically shows in the form of blocks the steps of data update by implementing an embodiment of an atomicity management method.

FIG. 2 schematically shows in the form of blocks the steps of data update by implementing an embodiment of an atomicity management method.

According to this embodiment, the atomicity management employs a word (for example, of one bit or of one byte) used as an atomicity flag or indicator to be stored in a non-volatile memory.

The steps which are described hereafter only concern the update in the EEPROM, which is the critical phase in terms of atomicity. Indeed, any manipulation of the data before or after the write update uses their value stored in registers or in a volatile memory and, in case of an interruption of the power supply, the data in the non-volatile memory remains reliable since such an interruption does not take place during the operation in the non-volatile memory.

For each update (block 21, UPDATE d) of data having their value D stored in the EEPROM, it is started (block 22, f←0) by initializing word f used as a flag in the non-volatile memory to a known value (for example, 0 or M). If the known value is 0, this actually amounts to an operation of erasing word f.

Then, data word d to be updated is erased from the non-volatile memory (block 23, ERASE d).

The writing of the new value D of word d into its memory location is then performed (block 24, d←D).

Finally, a known value (for example, M), different from the initialization value used at step 22 is written (block 25, f←M) into flag word f.

To consider that a three-state atomicity management is respected, it must be possible, on reading of data d, to determine whether it is reliable or not, whatever the time at which a power supply interruption occurs.

Figure 3:
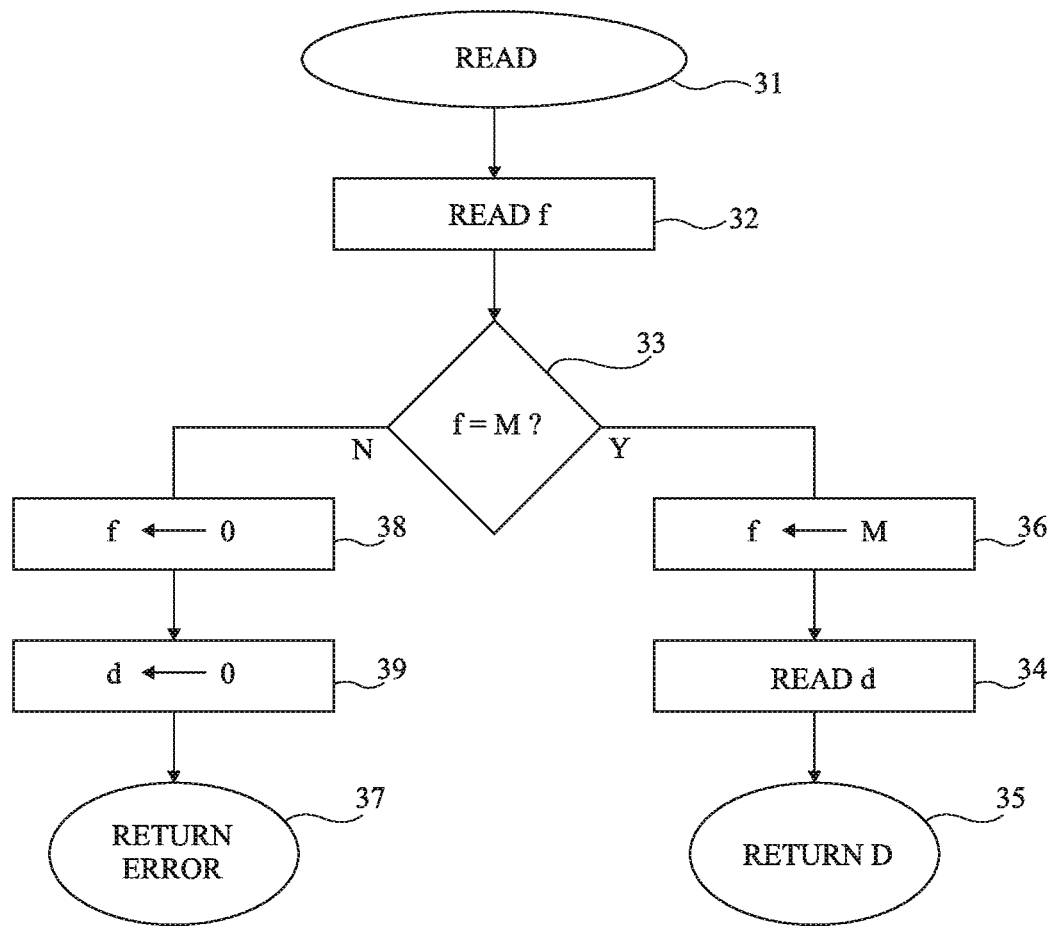
FIG. 3 schematically shows in the form of blocks steps of an embodiment of a method of reading out data written by implementing the atomicity management method of FIG. 2.

FIG. 3 schematically shows in the form of block the steps of an embodiment of a method of reading out data written by implementing the atomicity management method of FIG. 2.

For each reading (block 31, READ) of data word d, it is started by reading (block 32, READ f) the value of flag f.

This value is then compared (block 33, f=M?) with the expected value corresponding to the known value (for example, M), stored at end-of-writing step 25.

If test 33 is positive (output Y of block 33), this means that data d are stable. Data d can then be read (block 34, READ d) and value D is returned (block 35, RETURN D). Preferably, step 34 is preceded by a step (block 36, f←M) of confirmation of value M in flag f.

The order of steps 33 and 34 is of no importance. Similarly, step 36 may take place after step 34.

If flag f is not at expected value M (output N of block 33), this means that data d is unstable and the read process returns an error (block 37, RETURN ERROR). Preferably, step 37 is preceded by steps (block 38, f←0 and block 39, d←0) of confirmation of the initialization value (0) for the flag and of erasing of data d. Preferably, to detect a possible double-tearing, step 38 is carried out before step 39. Thus, if step 39 is carried out before step 38, a situation where an unstable (non-reliable) content off would direct (test 33) the algorithm for a first time towards steps 39 and 38 may be encountered. If data d are confirmed at 0 before having confirmed flag f at 0 and a second tearing occurs, the value of f might incidentally have value M and then positively pass the next test 33. This would then confirm data d as reliable, which is not right.

Step 38 of confirming the value of flag f at value 0 is used to avoid a false first reading. Indeed, in the absence of a confirmation, the situation of an unstable flag f which would alternately be read at value M and at a value different from M might be encountered. The confirmation is thus used to avoid for two successive readings to provide different results. Step 39 of erasing data d guarantees that a subsequent reading provides an unprocessable result.

It can thus be seen that, as soon as a power supply interruption or that a problem in the write steps (FIG. 2) occurs, the result of a subsequent reading returns an error.

Figure 4:
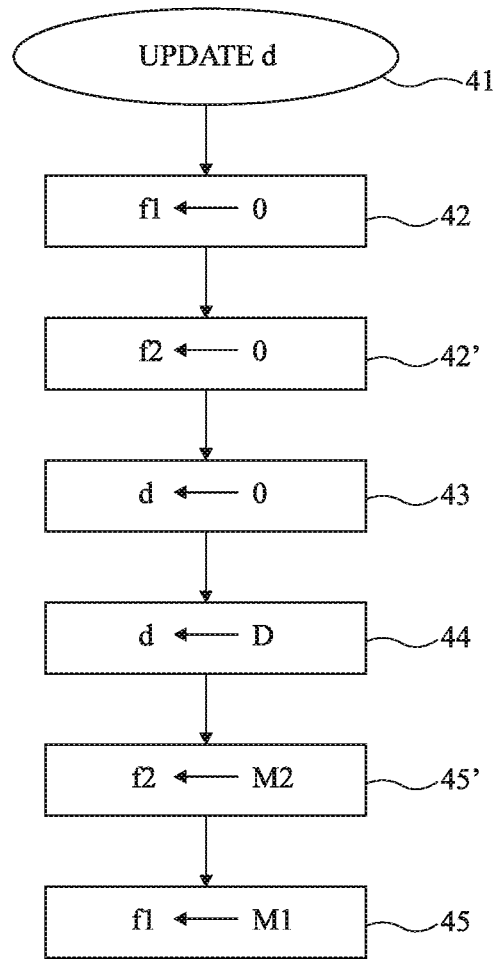
FIG. 4 schematically shows in the form of blocks the steps of updating data by implementing another embodiment of an atomicity management method.

FIG. 4 schematically shows in the form of blocks the steps of data update by implementing another embodiment of an atomicity management method.

As compared with the embodiment of FIG. 2, two flags f1 and f2 stored in a non-volatile memory are used.

Thus, for each update (block 41, UPDATE d) of data having their value D stored in the EEPROM, it is started (block 42, f1←0) by initializing a first word f1 used as a flag in the non-volatile memory to a known value (for example, 0) and (block 42', f2←0) a second word f2 also used as a flag in the non-volatile memory to a known value (for example, 0).

Then, data word d to be updated is erased from the non-volatile memory (block 43, d←0).

The writing of the new value D of word d into its memory location is then performed (block 44, d←D).

Finally, known values (for example M2 and M1), different from the initialization value (0) used at a step 42 are written (block 45', f2←M2 and block 45, f1←M1) into flag words f1 and f2. Preferably, the writing of the flags at steps 45' and 45 is performed in the reverse order with respect to their initialization of steps 42 and 42'.

Figure 5:
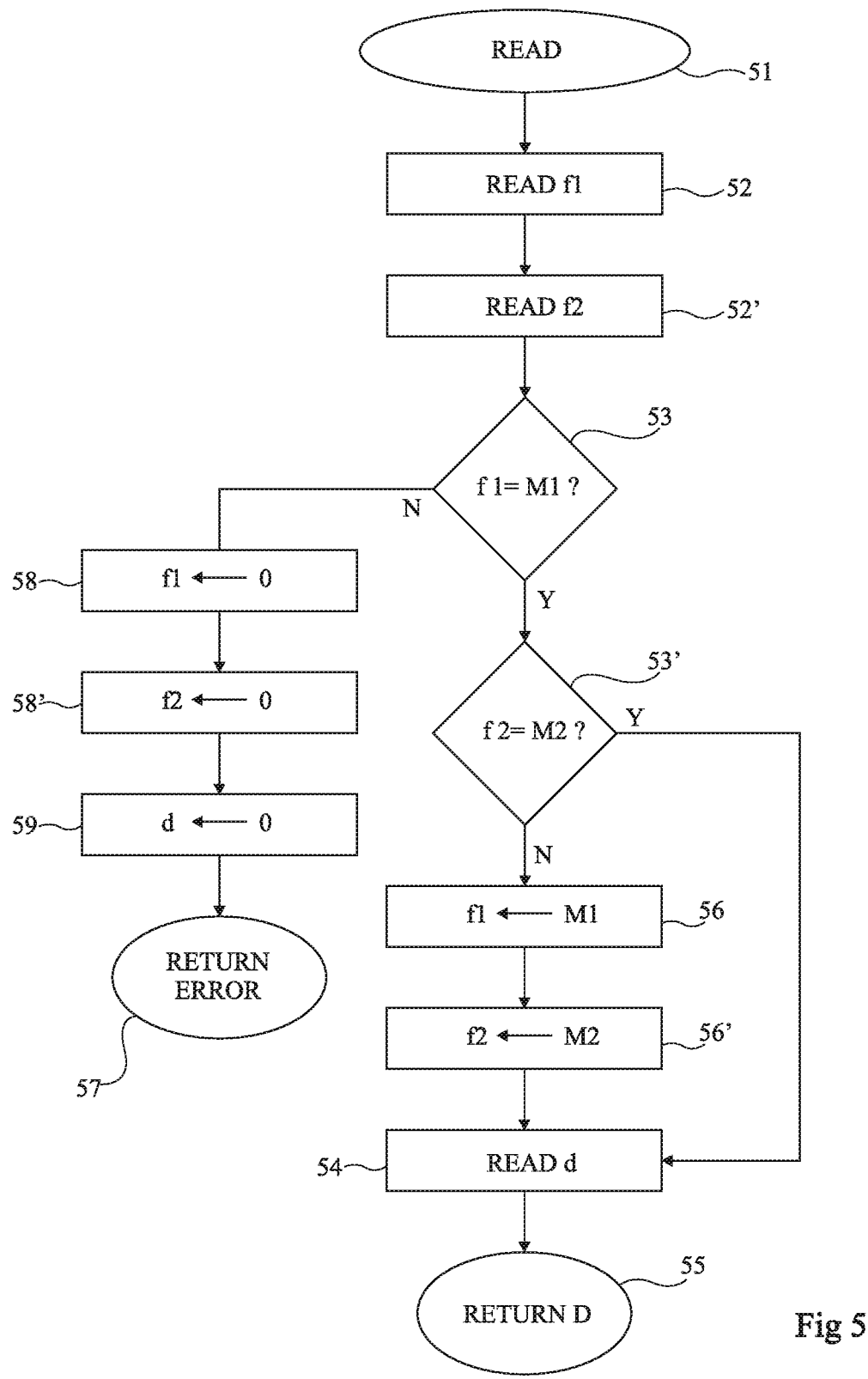
FIG. 5 schematically shows in the form of blocks the steps of another embodiment of a method of reading out data written by implementing the atomicity management method of FIG. 4.

FIG. 5 schematically shows in the form of blocks the steps of another embodiment of a method of reading out data written by implementing the atomicity management method of FIG. 4.

For each reading (block 51, READ) of data word d, it is started by reading (block 52, READ f1; block 52', READ f2) the respective values of flags f1 and f2.

The value of first flag f1 is then compared (block 53, f1=M1?) with the expected value corresponding to the known value (for example, M1) stored at end-of-writing step 45.

If flag f1 is not at expected value M1 (output N of block 53), this then means that data d are unstable and the reading process returns an error (block 57, RETURN ERROR). Preferably, step 57 is preceded by steps (block 58, f1←0; block 58', f2←0; block 59, d←0) of confirmation of the initialization value (0) of flags f1 and f2 and of erasing of data d. As for the embodiment of FIG. 3, the steps (58 and 58') of confirmation of the flags at the initialization value (0) are preferably carried out before erasing (59) the data to detect a double tearing and thus avoid validating, in a second reading, a false first reading.

Step 59 of erasing data d guarantees that a subsequent reading provides an unprocessable result.

If test 53 confirms that flag f1 has the correct value (output Y of block 53), the value of flag f2 is then compared (block 53', f=M2?) with the expected value corresponding to the known value (for example, M2), stored at end-of-writing step 45'.

If test 53' is positive (output Y of block 53'), and thus the two tests 53 and 53' are successively positive, this means that data d are stable. Data d can then be read (block 54, READ d) and value D is returned (block 55, RETURN D). A difference with respect to the embodiment of FIG. 3 is that data d is read without it being necessary to confirm the flag values.

If test 53' is negative (output N of block 53'), this means that the value of the flags should be reconfirmed. Steps (block 56, f1←M1; block 56', f2←M2) of confirmation of values M1 and M2 in respective flags f1 and f2 are then carried out before reading data d (block 54) and returning value D (block 55).

An advantage of the embodiment of FIGS. 4 and 5 over that of FIGS. 2 and 3 is that it avoids in case of an atomicity confirmation, which is the most frequency case, systematically having to confirm the flag values. These values are only confirmed if second flag f2 appears to be false while first flag f1 confirms that the data is reliable. A writing, which is power and time consuming, is thus spared.

The order of steps 52, 52' may be reversed. Further, it may be started by carrying out steps 52 and 53, and then carrying out steps 52' and 53' in case of a positive test 53. Further, step 54 may occur before steps 56 and 56' or be interposed therebetween.

It can here also be seen that, as soon as a power supply interruption or that a problem in the write steps (FIG. 4) occurs, the result of a subsequent reading returns an error.

Values M1 and M2 may be identical or different from each other.

The determined or known values (M; M1 and M2) to confirm the atomicity are indifferent, provided to be different from the initialization value.

The selection of a zero value (0) as an initialization value for the flag(s) has the advantage of representing an erasing. Thus, as long as a writing has not been performed or in case of unstable data, the flags are simply blank memory cells.

Flags f, or f1 and f2, need not have a large size. For example, one bit is sufficient. However, according to a preferred embodiment, a size corresponding to the write granularity of the EEPROM, for example, a byte, will be selected. An advantage is that this reinforces the reliability of the flags with no additional cost for the writing. For example, it may be provided to use certain bits of the byte to associate, with the flag(s), an error correction code. In the embodiment of FIGS. 4 and 5, it may be provided for each flag to be of one half byte to spare one write (confirmation) step for each reading.

Flag f or flags f1 and f2 may be stored in the EEPROM independently from data d, that is, not necessarily in the same memory page.

In the described embodiments, it is accepted to lose the data in case of an interruption, that is, if the data appears to be unstable.

An advantage of the described embodiments is that they avoid having to duplicate the initial value to recover it, as is the case in a dual-state process. This spares one writing of the data into the non-volatile memory, which amounts to a power and lifetime gain for the EEPROM, particularly in the case of large data.

The atomicity verification method is not necessarily implemented for all the data stored in the EEPROM. Preferably, it is only implemented for data for which the stable or unstable state of the data is desired to be known with certainty for each read operation.

Various embodiments have been described. Various alterations, modifications, and improvements will readily occur to those skilled in the art. Further, the practical implementation of the described embodiments is within the abilities of those skilled in the art based on the functional indications given hereinabove and by using circuits usual per se. Particularly, the organization of the memory addressing and the generation of the signals adapted to the control of said memory and to this addressing use techniques usual per se.

In particular, it is possible for steps 23 (or 43) and 24 (or 44), corresponding to the data erasing and writing steps, not to be successive and to be separated from processing steps or operations associated with the algorithm using the data. These steps will be protected in that in case of an interruption of the power supply after the erasing step, data d will be considered as unstable until the next writing and, most importantly, will be impossible to use since it will be erased.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing a write operation by steps including:
initializing a first flag to a first value and storing the first value of the first flag in an EEPROM;
initializing a second flag to a second value and storing the second value of the second flag in an EEPROM;
erasing a memory location in the EEPROM;
writing data into the memory location in the EEPROM; and
writing into the EEPROM a third value of the first flag and a fourth value of the second flag after completing writing the data into the memory location in the EEPROM.

2. The method of claim 1, further comprising:
in response to a request to read the data in the memory location, determining whether the first flag corresponds to the third value; and
returning the data only if a read value of the first flag corresponds to the third value.

3. The method of claim 2, comprising, wherein the determining includes:
reading the first flag to obtain the read value of the first flag; and
comparing the read value of the first flag with the third value, the method further comprising:
if the read and third values are different, returning an error.

4. The method of claim 1, further comprising:
reading a value of the first flag; and
if the read value of the first flag does not correspond to the third value, erasing the memory location.

5. The method of claim 1, further comprising:
reading a value of the first flag; and
if the read value of the first flag does not correspond to the third value, updating the first flag in the EEPROM with the first value.

6. The method of claim 1, wherein the first value corresponds to an erasing.

7. The method of claim 1, further comprising:
reading a value of the first flag; and
if the read value of the first flag corresponds to the third value, updating the first flag in the EEPROM with this second value.

8. The method of claim 1, further comprising:
in response to a request to read the data in the memory location, determining whether the first flag corresponds to the third value; and
in response to determining that the first flag corresponds to the third value, determining whether the second flag corresponds to the fourth value.

9. The method of claim 8, wherein, in response to determining that the second flag does not correspond to the fourth value, updating the first and second flags in the EEPROM with the third and fourth values, respectively.

10. The method of claim 1, wherein the first and second values are equal and the third and fourth values are different from each other.

11. An electronic circuit comprising:
an EEPROM; and
a processor configured to perform a write operation by steps including:
initializing to a first value a first flag in the EEPROM;
initializing to a second value a second flag in the EEPROM;
erasing a memory location in the EEPROM;
writing data into the memory location in the EEPROM; and
writing into the EEPROM a third value of the first flag and a fourth value of the second flag after completing writing the data into the memory location in the EEPROM.

12. The electronic circuit of claim 11, wherein the processor is configured to:
in response to a request to read the data in the memory location, determine whether the first flag corresponds to the third value; and
return the data only if a read value of the first flag corresponds to the third value.

13. The electronic circuit of claim 12, wherein the processor is configured to return an error if the read and third values are different.

14. The electronic circuit of claim 12, wherein the first and second values are equal and the third and fourth values are equal.

15. The electronic circuit of claim 11, wherein the processor is configured to:
in response to a request to read the data in the memory location, determine whether the first flag corresponds to the third value; and
if the read value of the first flag does not correspond to the third value, erase the memory location.

16. The electronic circuit of claim 11, wherein the processor is configured to:
in response to a request to read the data in the memory location, determine whether the first flag corresponds to the third value; and
in response to determining that the first flag corresponds to the third second value, determine whether the second flag corresponds to the fourth value.

17. The electronic circuit of claim 16, wherein the processor is configured to, in response to determining that the second flag does not correspond to the fourth value, update the first and second flags in the EEPROM with the third and fourth values, respectively.

18. A method, comprising:
in response to a request to read data in a memory location of an EEPROM, reading a first flag stored in the EEPROM;
determining whether a read value of the first flag corresponds to a first value or a second value, the first value indicating that the data in the memory location was not updated completely and the second value indicating that the data in the memory location was updated completely; and
in response to determining that the read value of the first flag corresponds to the second value, determining whether a second flag in the EEPROM corresponds to a third value.

19. The method of claim 18, further comprising performing a write operation by steps including:
initializing the first flag to the first value;
erasing the memory location in the EEPROM;
writing the data into the memory location in the EEPROM; and
writing the second value of the first flag into the EEPROM after completing writing the data into the memory location in the EEPROM.

20. The method of claim 18, further comprising:
if the read value of the first flag does not correspond to the second value, erasing the memory location.

21. The method of claim 18, further comprising:
in response to determining that the first flag corresponds to the first value, returning an error.

22. The method of claim 18, wherein, in response to determining that the second flag does not correspond to the third value, updating the first and second flags in the EEPROM with the second and third values, respectively.

23. The method of claim 18, wherein the first and second values are not equal and the second and third values are different from each other.

* * * * *

UNITED STATES PATENT AND TRADEMARK OFFICE
CERTIFICATE OF CORRECTION

| | |
|---|---|
| PATENT NO. | : 10,714,189 B2 |
| APPLICATION NO. | : 16/007941 |
| DATED | : July 14, 2020 |
| INVENTOR(S) | : Guillaume Docquier |

Page 1 of 1

It is certified that error appears in the above-identified patent and that said Letters Patent is hereby corrected as shown below:

Column 8, Line 66, Claim 16:
"third second value" should read, --third value--.

Signed and Sealed this
Twenty-fifth Day of August, 2020

Andrei Iancu
*Director of the United States Patent and Trademark Office*